United States Patent [19]

Tagaya et al.

[11] Patent Number: 4,921,758

[45] Date of Patent: May 1, 1990

[54] MOLDED PRODUCT OF POLYARYLENE THIOETHER AND THE USE THEREOF

[75] Inventors: Kiyoshi Tagaya; Satoshi Hirose; Takao Iwasaki; Toshitaka Kouyama; Yasuo Sakaguchi, all of Iwaki, Japan

[73] Assignee: Kureha Kagaku Kogyo Kabushiki Kaisha, Tokyo, Japan

[21] Appl. No.: 140,997

[22] Filed: Jan. 5, 1988

[30] Foreign Application Priority Data

Feb. 24, 1987 [JP] Japan .................................. 62-40949

[51] Int. Cl.$^5$ ...................... B29C 47/02; B29C 55/06; B29C 71/00; B32B 1/08

[52] U.S. Cl. .............................. 428/419; 174/110 SR; 264/83; 264/174; 264/211.12; 264/235.6; 264/289.6; 428/457; 525/535; 525/537; 528/388

[58] Field of Search ..................... 264/83, 174, 211.12, 264/232, 233, 235, 235.6, 288.4, 331.11, 289.6; 427/117, 120; 174/110 SR, 110 PM; 428/373, 375, 379, 419, 458, 704, 457; 525/535, 537; 528/388

[56] References Cited

U.S. PATENT DOCUMENTS

| | | | |
|---|---|---|---|
| 3,524,835 | 8/1970 | Edmonds, Jr. et al. | 528/388 X |
| 3,699,087 | 10/1972 | Wood et al. | 528/388 |
| 3,793,256 | 2/1974 | Scoggin | 525/537 X |
| 3,898,204 | 8/1975 | Short et al. | 528/388 |
| 3,948,865 | 4/1976 | Brady et al. | 525/537 |
| 4,145,474 | 3/1979 | Kertscher et al. | 428/379 |
| 4,286,018 | 8/1981 | Asakura et al. | 428/419 X |
| 4,451,607 | 5/1984 | Garcia et al. | 525/537 X |
| 4,613,654 | 9/1986 | Katto et al. | 525/537 |
| 4,629,778 | 12/1986 | Sugie et al. | 528/388 |
| 4,645,826 | 2/1987 | Iizuka et al. | 528/388 |
| 4,699,975 | 10/1987 | Katto et al. | 528/388 X |
| 4,777,228 | 10/1988 | Mizuno et al. | 525/535 |
| 4,785,057 | 11/1988 | Shiiki et al. | 525/537 |
| 4,810,566 | 3/1989 | Kawakami et al. | 264/235.6 X |

FOREIGN PATENT DOCUMENTS

| | | |
|---|---|---|
| 129202 | 12/1984 | European Pat. Off. . |
| 166451 | 1/1986 | European Pat. Off. . |
| 201851 | 11/1986 | European Pat. Off. . |
| 233494 | 8/1987 | European Pat. Off. . |
| 49-71479 | 7/1974 | Japan . |
| 60-185306 | 9/1985 | Japan . |

OTHER PUBLICATIONS

EP 88 30 0267, Search Report for European Patent Application.

Primary Examiner—Jeffery Thurlow
Assistant Examiner—Leo B. Tentoni
Attorney, Agent, or Firm—Oblon, Spivak, McClelland, Maier & Neustadt

[57] ABSTRACT

The present invention discloses a molded product which is heat-resistant, has a high elongation and is produced by a process including the steps of (1) curing a substantially linear polyarylene thioether having a melt viscosity of about 1,000 to 15,000 poise, thereby forming a polyarylene thioether resin having a melt viscosity of about 5,000 to 16,000 poise and a non-Newtonian coefficient, n, of about 1.5 to 2.1, (2) melt extruding the formed polyarylene thioether resin, (3) taking off the extruded polyarylene thioether resin at an $R_1$ (ratio of the taking-off speed to the extruding speed at the nozzle of the melt extruded product) of about 10 to 1,000 and (4) crystallizing the taken off polyarylene thioether resin until its crystallization degree is not lower than 20 wt %; and coated electric wires having the above molded product as a coating layer.

9 Claims, No Drawings

MOLDED PRODUCT OF POLYARYLENE THIOETHER AND THE USE THEREOF

BACKGROUND OF THE INVENTION

The present invention relates to an molded product of polyarylene thioether (hereinafter referred to as PATE) crystallized and having a high elongation.

More in detail, the present invention relates to an molded product which has been produced by curing a substantially linear PATE having a melt viscosity (hereinafter means the value measured at 310° C. and a shearing rate of 200 second$^{-1}$) of 1,000 to 15,000 poises, thereby converting the PATE into a PATE resin showing the melt viscosity of 5,000 to 16,000 poises and a non-Newtonian coefficient, n, of 1.5 to 2.1, melt-extruding the cured PATE resin, taking-off the extruded PATE resin at $R_1$ (hereinafter defined as the ratio of a taking-off speed to an extruding speed at the nozzle of a melt extruded product) of 10 to 1,000 and then crystallizing the taken-off material until its crystallization degree (hereinafter defined as the value measured by a density method) reaches not less than 20 wt%.

Further, the present invention relates to a use of the molded PATE product, namely, a coated electric wire having the molded product as a coating layer.

Hitherto, PATE represented by polyparaphenylene thioether is one of the engineering resins which are excellent in various physical properties such as heat-resistance, chemical resistance, flame resistance, moisture-resistance, rigidity, etc. Most of these physical properties are not expressed unless PATE is sufficiently crystallized. Accordingly, it is an extremely important matter to increase the crystallization degree of the molded product of PATE. However, when a molded product of PATE is sufficiently crystallized by a thermal fixing treatment, the elongation of the product is reduced sharply while the heat-resistance of the product is increased. Accordingly, there has been a problem that such a PATE is unsuitable for the heat-resistant coating of electric wires to which high elongation is required together with a heat-resistance.

The present inventors have extensively studied for obtaining a molded PATE resin product, which has a heat-resistance and a high elongation simultaneously. They have finally found that a molded product of PATE resin, which has a heat-resistance and a high elongation simultaneously, can be obtained by melt-extruding a PATE having appropriate viscosity and non-Newtonian coefficient, which is obtained by curing a substantially linear PATE and fluid-orienting the extruded product by taking-off the extruded PATE with appropriate speed, then highly crystallizing the extruded product by a thermal fixing treatment.

The present invention has been completed on the basis of those findings.

SUMMARY OF THE INVENTION

The object of the present invention is to provide an extruded product of PATE, which has a high elongation in spite of its high heat-resistance as a result of increasing its crystallization degree.

The molded product of a crystallized PATE having a high elongation, which is the object of the present invention, is obtained by the process comprising the steps of (1) curing a substantially linear polyarylene thioether which has the repeating unit of $+Ar-S+$ (hereinafter, Ar represents an arylene group) as the main constituent and shows a melt viscosity of 1,000 to 15,000 poises at a temperature of 310° C. and a shearing rate of 200 second$^{-1}$ and make its melt viscosity at 310° C. and a shearing rate of 200 second$^{-1}$ in the range of 5,000 to 16,000 poises and its non-Newtonian coefficient, n, in the range of 1.5 to 2.1, thereby forming a polyarylene thioether resin, (2) melt extruding the formed polyarylene thioether resin, (3) taking off the extruded polyarylene thioether resin at $R_1$ in the range of 10 to 1,000 and (4) crystallizing the taken off material until the crystallization degree of the product reaches not less than 20 wt%.

Further, the object of the present invention is to provide a coated electric wire having the molded product of PATE as the coating layer.

DETAILED DESCRIPTION OF THE INVENTION

The molded product according to the present invention is produced by the process comprising the steps of (1) curing a substantially linear polyarylene thioether which has the repeating unit of $+Ar-S+$ as the main constituent and shows the melt viscosity of 1,000 to 15,000 poises at a temperature of 310° C. and a shearing rate of 200 second$^{-1}$ and make its melt viscosity at 310° C. and a shearing rate of 200 second$^{-1}$ in the range of 5,000 to 16,000 poises and its non-Newtonian coefficient, n, in the range of 1.5 to 2.1, thereby forming a polyarylene thioether resin, (2) melt extruding the formed polyarylene thioether resin, (3) taking off the extruded polyarylene thioether resin at $R_1$ in the range of 10 to 1,000 and (4) crystallizing the taken off material until the crystallization degree of the product reaches not less than 20 wt%.

Further, the coated electric wire according to the present invention is produced by the process comprising the steps of (1) curing a substantially linear polyarylene thioether which has the repeating unit of $+Ar-S+$ as the main constituent and shows the melt viscosity of 1,000 to 15,000 poises at a temperature of 310° C. and a shearing rate of 200 second$^{-1}$ make its melt viscosity at 310° C. and a shearing rate of 200 second$^{-1}$ in the range of 5,000 to 16,000 poises and its non-Newtonian coefficient, n, in the range of 1.5 to 2.1, thereby forming a polyarylene thioether resin, (2) melt extruding the formed polyarylene thioether resin and coating a conducting core wire with the PATE resin, (3) taking off the extruded polyarylene thioether resin, which coats said conducting core wire, at $R_1$ in the range of 10 to 1,000 and (4) crystallizing the taken off material until the crystallization degree of the product reaches not less than 20 wt%.

Basic Resin

The basic resin which is the subject of the present invention comprises a PATE.

PATE

The PATE used for curing of the present invention is a homopolymer or a copolymer having a repeating unit of the formula, $+Ar-S+$, as the main constituent. The PATE may contain a small amount of branched bonds or cross-linked bonds represented by

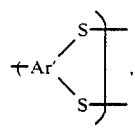

provided that its specific property as the linear polymer is not spoiled.

As the Ar, the following groups can be exemplified:

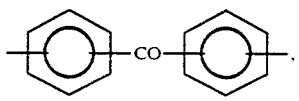

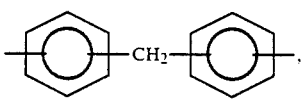

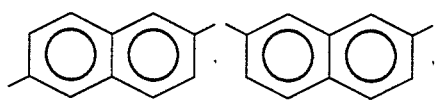

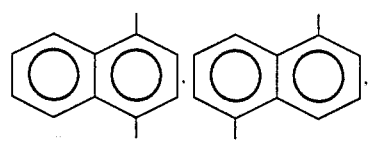

wherein R represents an alkyl group or an alkoxy group, particularly, having carbon numbers of about 1 to 4.

As the Ar', there are the groups of

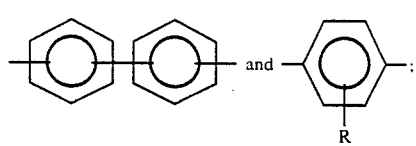

etc. As a phenylene group,

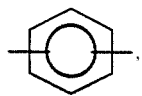

a paraphenylene group,

is preferable.

As the particularly preferable PATE, a paraphenylene thioether homopolymer and a phenylene thioether copolymer containing not less than 70 mol% of paraphenylene thioether units as the main constituent may be mentioned.

As a copolymer, a block copolymer is particularly preferable from the view point of heat-resistance and processability. As a copolymer unit other than paraphenylene thioether, metaphenylene thioether unit,

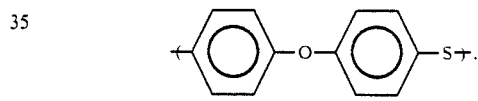

diphenylketone thioether unit,

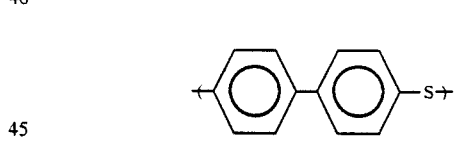

diphenylether thioether unit,

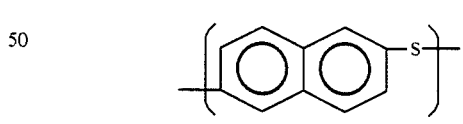

biphenyl thioether unit,

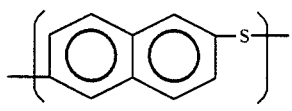

and 2,6-naphthalene thioether unit,

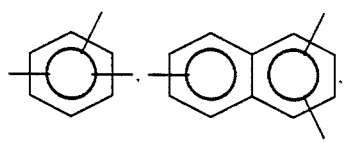

can be mentioned.

However, a polymer containing a trifunctional unit can also be used as far as the linearity of the polymer is maintained.

As a phenylene thioether block copolymer, the block copolymer of paraphenylene thioether and metaphenylene thioether is particularly suitable.

The block copolymer comprises a repeating unit of

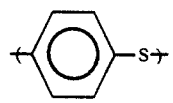

and a repeating unit of

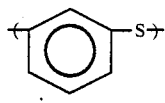

and as far as the formation of each block and the bonding of both blocks are possible, the copolymer can be produced by any conventional method. For instance, the method disclosed in European Patent Application Laid-Open No. 166,451 (1987) can be used. As a practical method for producing such a block copolymer, a method, wherein one of the blocks is formed first and then the other of the blocks is formed at the site of already formed block, therefore the formation and the bonding of blocks are realized simultaneously, can be mentioned.

As the PATE resin for the molded product of the present invention, a material obtained by moderately curing the PATE not yet being cured, is preferable. Hereupon, the word, "curing", is defined to be "a treatment to increase viscosity of the resin, involving an oxidation reaction".

As the not-yet cured PATE which is to be used as the starting material of the present invention, a substantially linear polymer having the chemical structure disclosed above is preferable.

Hereupon, the "substantially linear polymer" is not a polymer which is obtained by the increase of viscosity (curing) but a polymer obtained from a monomer substantially comprising a bifunctional monomer as the main body.

Thus, to judge if a polyarylene sulfide of a high molecular weight is a substantially linear polymer or not is based on the following standard: in the measurement of a melt viscosity of the polymer, for example, at 310° C., how small the dependency of the melt viscosity to the shearing rate is, namely, in the formula, $D = \alpha S^n$, wherein D is the shearing rate, S is the shearing stress and n and $\alpha$ are the constants, how the non-Newtonian coefficient, n, is close to 1.

A PATE which is substantially linear is the PATE having n value in the range of about 1 to 2 when obtained at a shearing rate of near 200 second$^{-1}$. For the PATE, of which viscosity has been increased by curing, in order to have both appropriate melt viscosity, $\eta^*$, and appropriate non-Newtonian coefficient, n, simultaneously, it is necessary to use a basic resin, of which melt viscosity is in the range of 1,000 to 15,000 poises.

As a method of curing the basic resin, PATE, a method of heating PATE at a high temperature in the atmosphere containing oxygen and a method of treating PATE by using an oxidant such as $H_2O_2$ or a vulcanization agent such as S, can be applied. As an example of the former method, the methods described in U.S. Pat. Nos. 3,793,256 and 3,524,835, may be mentioned and as an example of the latter method, the methods described in U.S. Pat. Nos. 3,948,865 and 3,699,087 may be mentioned. From the viewpoint of the simplicity of treatment and the physical properties of the cured PATE obtained, the former method is particularly preferable.

It is necessary to carry out the curing treatment so that the melt viscosity, $\eta^*$, of the PATE resin obtained by the above treatment is increased in the range of 5,000 to 16,000 poises, preferably in the range of 6,000 to 14,000 poises and the non-Newtonian coefficient, n, becomes in the range of 1.5 to 2.1, preferably in the range of 1.55 to 2.0. When $\eta^*$ is below 5,000 poise, it is difficult to obtain a crystallized, molded product of a high elongation, and on the other hand, when $\eta^*$ is over 16,000 poises, the melt extruded material is apt to be broken at the time of taking off and accordingly, both cases are not preferable. Further, when the non-Newtonian coefficient, n, is below 1.5, it is difficult to obtain a crystallized, molded product of a high elongation and on the other hand, when n is over 2.1, the melt extruded product is apt to be broken at the time of taking off and accordingly, both cases are not preferable, either.

The non-Newtonian coefficient, n, in the present invention is a coefficient satisfying the relationship of the following formula at 310° C. and the shearing rate of 200 second$^{-1}$.

$$D = \alpha \cdot S^n$$

wherein D is the shearing rate, S is the shearing stress and $\alpha$ is a constant. The value of n is supposed to represent the degree of cross-linking, branching and entanglement of molecular chains of a resin.

Melt Extrusion and Taking Off

The melt extrusion according to the present invention means the process comprising the steps of supplying the cured PATE resin to an extruder, heating the resin above its melting point and melting the resin and continuously extruding the molten resin through a die or a nozzle.

It is preferable to immediately take off the molten material extruded from the extruder while using a winder role, etc. At that time, it is necessary to maintain $R_1$ in the range of 10 to 1,000 and preferably, in particular, in the range of 20 to 500.

When $R_1$ is below 10, it is difficult to obtain a crystallized, molded product of a high elongation, and on the other hand, when $R_1$ is over 1,000, there is a risk of breaking a molded products during taking off and accordingly, both cases are not preferable.

Highly Crystallizing Treatment

It is necessary to highly crystallize the product obtained by melt extruding a cured PATE resin and taking off the extruded material at an appropriate $R_1$. Because, by this crystallizing treatment, it becomes possible to make the molded product exhibit the various specific properties, for example, excellent heat-resistance, chemical resistance and mechanical properties.

It is necessary to carry out the highly crystallizing treatment until the crystallization degree of the product reaches not less than 20 wt%, preferably not less than 25 wt%. When the crystallization degree is below 20 wt%, there is a risk that the appearance of the said excellent specific properties is insufficient. The crystallization degree is a value calculated from the density of the material while measuring the density with a density gradient tube (calculated on the basis that the density of crystallized part of PATE is 1.43 and that of amorphous part is 1.32).

The highly crystallizing treatment can be carried out, for instance, by a conventional thermal fixing method. Namely, the molded product obtained by taking off at $R_1$ of 10 to 1,000 is heated, under a limited deformation, at a temperature of not lower than its second transition temperature and below its melting point, more preferably in the temperature range of 130° to 280° C. Other than the thermal fixing method, the method of treating the molded product with an organic solvent (Japanese Patent Application No. 61-12889 (1986)) and the method of combining the treatment with an organic solvent and the thermal treatment (Japanese Patent Application No. 61-296,454 (1986)) can be used for the purpose. Both methods have been developed by the present inventors.

Production of a Coated Electric Wire

One desirable utilization of the molded product of the present invention is its use as a coating layer of a coated electric wire.

The method for producing the coated electric wire using a resinous material as a coating layer has been well known and the coated electric wire according to the present invention can be produced by any reasonable and optional method. Practically, the production method comprises the step of carrying out the melt extrusion of a resinous material for coating while arranging the conducting core wire to be covered by the extruded resin and in this method, the molding conditions according to the present invention are to be enforced.

Properties of the Molded Product of the Present Invention

As the molded product of PATE resin according to the present invention, a crystallized material of the crystallization degree of not less than 20 wt% is preferred, more preferably not less than 25 wt%. Furthermore, it is preferable that the molded product according to the present invention is the material having an elongation of not less than 100%.

The molded product of PATE resin which can satisfy the above conditions can be preferably used in the fields requiring a high elongation together with heat-resistance, such as a coating layer of heat-resistant electric wires.

As a result of the present invention, the crystallized, molded products, which are suitable for heat-resistant electric wire coating, industrial fibers, stampable sheets requiring heat-resistance together with a high elongation (the elongation even becomes not less than 100%), become easily obtainable.

Accordingly, the molded product of PATE resin of the present invention can be used in various purposes such as heat-resistant electric wire coating, industrial fibers, stampable sheet, tray for oven, electric insulators, etc.

EXAMPLES

Synthetic Example 1

Into a titanium-lined autoclave, 423 kg of hydrated sodium sulfide (solid content: 46.11%) and 974 kg of N-methylpyrrolidone (NMP) were introduced and the content of the autoclave was heated to about 203° C. to distill out water (the total amount of water in the autoclave/NMP=3.5 mol/kg). Then, 372 kg of p-dichlorobenzene were introduced into the autocalve (the total amount of arylene group/NMP=2.6 mol/kg).

After reacting the materials at 220° C. for 5 hours, 61.5 kg of water were additionally charged and polymerization reaction was carried out at 256° C. for 4 hours to obtain a slurry containing the polymer formed.

The slurry was sieved through a 0.1 mm mesh screen and only the granular polymer was separated, washed with acetone and then with water to obtain a cleaned polymer. By drying the cleaned polymer at 80° C. under a reduced pressure, Polymer A was obtained. The melt viscosity, $\eta^*$, of Polymer A was 680 poises.

Synthetic Example 2

Into a titanium-lined autoclave, 424 kg of hydrated sodium sulfide (solid content: 46.02%) and 974 kg of NMP were introduced and the content of the autoclave was heated to about 203° C. to distill out water (the total amount of wwater in the autoclave/NMP=3.5 mol/kg). Then, 367 kg of p-dichlorobenzene were introduced into the autoclave (the amount of arylene group/NMP=2.6 mol/kg).

After reacting the content at 220° C. for 5 hours, 61.5 kg of water were additionally charged and polymerization reaction was carried out at 260° C. for 1.5 hours and at 240° C. for 3 hours to obtain a slurry containing the polymer formed.

The slurry was sieved through a 0.1 mm mesh screen and only the granular polymer was separated, washed with acetone and then with water to obtain a cleaned polymer. By drying the cleaned polymer at 80° C. under a reduced pressure, Polymer B was obtained. The melt viscosity, $\eta^*$, of Polymer B was 1,800 poises.

Synthetic Example 3

Into a titanium-lined autoclave, 372 kg of hydrated sodium sulfide (solid content: 46.12%) and 1,023 kg of NMP were introduced, and the content of the autoclave was heated to about 203° C. to distill out water. Thereafter, 4.5 kg of water and 42 kg of NMP were added to the autoclave (the total amount of water in the autoclave/NMP=3.0 mol/kg). Then, 323 kg of p-dichlorobenzene were introduced into the autoclave (the total amount of arylene group/NMP=2.7 mol/kg).

After reacting the content at 220° C. for 5 hours, 96 kg of water were additionally charged and polymerization reaction was carried out at 265° C. for 30 minutes and at 244° C. for 6 hours to obtain a slurry containing the polymer formed.

The slurry was sieved through a 0.1 mm mesh screen and only the granular polymer was separated, washed with acetone and then with water to obtain a cleaned polymer. By drying the cleaned polymer at 80° C. under a reduced pressure, Polymer C was obtained. The melt viscosity, $\eta^*$, of Polymer C was 4,100 poises.

Synthetic Example 4

Into a titanium-lined autoclave, 372 kg of hydrated sodium sulfide (solid content: 46.26%) and 1,030 kg of NMP were introduced, and the content of the autoclave was heated to about 203° C. to distill out water and 7 kg of water and 46 kg of NMP were added to the autoclave (the total amount of water in the autoclave/NMP=3.0 mol/kg). Then, 319 kg of p-dichlorobenzene were introduced into the autoclave (the total amount of arylene group/NMP=2.0 mol/kg).

After reacting the content at 220° C. for 5 hours, 97 kg of water were additionally charged and polymerization reaction was carried out at 256° C. for 3 hours and at 244° C. for 8 hours to obtain a slurry containing the polymer formed.

The slurry was sieved through a 0.1 mm mesh screen and only the granular polymer was separated, washed with acetone and then with water to obtain a cleaned polymer. By drying the cleaned polymer at 80° C. under a reduced pressure, Polymer D was obtained. The melt viscosity, $\eta^*$, of Polymer D was 8,000 poises.

Synthetic Example 5

Into a titanium-lined autoclave provided with a stirring apparatus and paddle-type blades (further provided with a push-up valve of a clearance of 10 mm for taking down the product at the bottom of the autoclave), 145 kg of NMP and 250 mol of hydrated sodium sulfide (solid content: 46.20%) were introduced, and the content of the autoclave was heated to about 204° C. while stirring the content at a rotation number of 120 RPM under a nitrogen flow to distill out water. After adding 250 mol of p-dichlorobenzene (arylene group/NMP=2.0 mol/kg, total amount of water/NMP=2.7 mol/kg), the content was polymerized at 220° C. for 5 hours to form a prepolymer.

Into the reaction liquid containing the prepolymer, 500 mol of water and 0.5 mol of 1,3,5-trichlorobenzene were added and while stirring the formed mixture at a rotation number of 120 RPM, the second step of polymerization was started. Namely, the temperature of the reaction mixture was maintained at 260° C. for 30 minutes and then the reaction mixture was rapidly cooled and the temperature of the reaction mixture was adjusted to 248° C. and maintained at the level for 4 hours.

After finishing the reaction, the push-up valve was immediately opened to take down all the reaction slurry into a take-down vessel. Substantially no polymer remained in the autoclave.

The reaction slurry was taken from the take-down vessel and was separated into the polymer (granular) and the other components (salt-containing solvent) with a screen of 0.1 mm mesh. The separated polymer was washed with acetone and then with water repeatedly three times and was dried. The melt viscosity, $\eta^*$, of the obtained Polymer E was 22,000 poises.

Curing Example

A part of the respective Polymers A to E obtained by the polymerization was supplied to a shelf-staged drier of air circulating type and was cured at a predetermined temperature for a predetermined time period. The curing conditions are shown in Table 1 collectively.

The melt viscosity, $\eta^*$, of each Polymer A to E and each cured products A1 to E1 was measured with a capirograph (made by TOYO-SEIKI Co.) at 310° C. and a shearing rate of 200 second$^{-1}$. Further, by applying the measured value to the formula, $D=\alpha S^n$, the non-Newtonian coefficient, n, of each material was calculated. The obtained values of $\eta^*$ and n are shown in Table 2 collectively.

TABLE 1

| Resin Code | Raw Material PATE | Curing Temp. (°C.) | Curing Time (Hour) |
|---|---|---|---|
| A | A | — | — |
| A1 | A | 250 | 3 |
| A2 | A | 260 | 5 |
| B | B | — | — |
| B1 | B | 250 | 1 |
| B2 | B | 260 | 2 |
| C | C | — | — |
| C1 | C | 250 | 1 |
| C2 | C | 250 | 2 |
| C3 | C | 260 | 4 |
| D | D | — | — |
| D1 | D | 250 | 0.5 |
| D2 | D | 250 | 1 |
| D3 | D | 260 | 2 |
| E | E | — | — |
| E1 | E | 250 | 0.5 |

Example of Extrusion, Taking-Off and Thermal Fixing

Each of the obtained PATE resins (code number: A to E1) was extruded at 310° C. through a nozzle of 1.0 mm in nozzle diameter installed to the capirograph, and was wound up onto a winding bobbin while controlling $R_1$. The string-like molded products which could be wound up without breaking were thermally fixed at 200° C. for 2 hours while keeping them on the bobbins as wound and crystallized.

The elongation at break of the thermally fixed string-like, molded products were measured by stretching their specimens with Tensilon (made by SHIMAZU SEISAKUSHO) under the conditions of a temperature of 23° C., a stretching speed of 100 m/minute and a length of the specimen of 100 mm. Further crystallization degrees of these string-like, molded products were calculated from the densities (at 23° C.) measured by using a density gradient tube of an aqueous 1% hydrochloric acid solution of zinc chloride.

The results are shown in Table 2 collectively.

TABLE 2-1

| Code of Exp. | DATE resin Code | $\eta^*$(poise) | n | $R_1$ | Crystallization degree (%) | Elongation (%) | Remarks |
|---|---|---|---|---|---|---|---|
| 1-1 | A | 680 | 1.02 | 120 | 30 | 3 | low $\eta^*$,n Com. Ex. |
| 1-2 | A | 680 | 1.02 | 25 | 32 | 4 | low $\eta^*$,n Com. Ex. |
| 1-3 | A1 | 2,100 | 1.28 | 120 | 29 | 40 | low $\eta^*$,n Com. Ex. |
| 1-4 | A1 | 2,100 | 1.28 | 25 | 30 | 20 | low $\eta^*$,n Com. Ex. |
| 1-5 | A2 | 5,100 | 2.25 | 120 | — | — | high $\eta^{*1}$ Com. Ex. |
| 1-6 | A2 | 5,100 | 2.25 | 25 | — | — | high $\eta^{*1}$ Com. Ex. |
| 2-1 | B | 1,800 | 1.05 | 120 | 31 | 4 | low $\eta^*$,n Com. Ex. |
| 2-2 | B | 1,800 | 1.05 | 25 | 29 | 5 | low $\eta^*$,n Com. Ex. |
| 2-3 | B1 | 2,700 | 1.35 | 120 | 28 | 50 | low $\eta^*$,n Com. Ex. |
| 2-4 | B1 | 2,700 | 1.35 | 25 | 30 | 10 | low $\eta^*$,n Com. Ex. |
| 2-5 | B2 | 5,500 | 1.70 | 120 | 28 | 140 | Example |
| 2-6 | B2 | 5,500 | 1.70 | 25 | 28 | 120 | Example |
| 3-1 | C | 4,100 | 1.25 | 120 | 29 | 4 | low $\eta^*$,n Com. Ex. |
| 3-2 | C | 4,100 | 1.25 | 25 | 29 | 4 | low $\eta^*$,n Com. Ex. |
| 3-3 | C1 | 5,900 | 1.41 | 120 | 28 | 60 | low n, Com. Ex. |
| 3-4 | C1 | 5,900 | 1.41 | 25 | 29 | 15 | low n, Com. Ex. |
| 3-5 | C2 | 7,400 | 1.55 | 120 | 28 | 180 | Example |
| 3-6 | C2 | 7,400 | 1.55 | 25 | 28 | 150 | Example |
| 3-7 | C3 | 17,500 | 1.85 | 120 | — | — | high $\eta^{*1}$ Com. Ex. |
| 3-8 | C3 | 17,500 | 1.85 | 25 | — | — | high $\eta^{*1}$ Com. Ex. |
| 4-1 | D | 8,000 | 1.40 | 120 | 28 | 3 | low n, Com. Ex. |
| 4-2 | D | 8,000 | 1.40 | 25 | 30 | 3 | low n, Com. Ex. |
| 4-3 | DS1 | 9,600 | 1.62 | 120 | 28 | 130 | Example |

TABLE 2-1-continued

| Code of Exp. | DATE resin Code | $\eta^*$(poise) | n | $R_1$ | Crystallization degree (%) | Elongation (%) | Remarks |
|---|---|---|---|---|---|---|---|
| 4-4 | D1 | 9,600 | 1.62 | 25 | 29 | 110 | Example |
| 4-5 | D2 | 11,200 | 1.76 | 120 | 28 | 200 | Example |
| 4-6 | D2 | 11,200 | 1.76 | 25 | 27 | 310 | Example |
| 4-7 | D3 | 17,000 | 1.98 | 120 | — | — | high $\eta^{*1}$ Com. Ex. |
| 4-8 | D3 | 17,000 | 1.98 | 25 | — | — | high $\eta^{*1}$ Com. Ex. |
| 5-1 | E | 22,000 | 1.74 | 120 | — | — | high $\eta^{*1}$ Com. Ex. |
| 5-2 | E | 22,000 | 1.74 | 25 | — | — | high $\eta^{*1}$ Com. Ex. |
| 5-3 | E1 | 26,500 | 1.88 | 120 | — | — | high $\eta^{*1}$ Com. Ex. |
| 5-4 | E1 | 26,500 | 1.88 | 25 | — | — | high $\eta^{*1}$ Com. Ex. |

*[1] The sample was broken at the time of taking-off.

EXAMPLE OF COATING ELECTRIC WIRE

The PATE resin which could be wound up without breaking in the above examples was melt-extruded to coat a copper wire of 1.0 mm in diameter with an average thickness of coated layer of 40 μm with a small type extruder (20 mm in diameter) provided with a die-tip for wire-coating.

Instantly after the melt-coating, the coated wire was taken off at a predetermined $R_1$, rapidly cooled with water bath and wound up. The wound, coated wire was crystallized by heating the surface of the coating to about 180° to 190° C. passing through an infrared heating room.

The occurrence of crackings of the crystallized, coating electric wire caused by winding up the wire 10 times around the wire itself was checked by naked eyes according to the method of winding of Japanese Industrial Standards C-3003, flexibility test 8.1.1.(2).

The results were shown in Table 3, with the terms of "present" and "absent".

TABLE 3

| Code of Exp. | Code of Resin | $R_1$ | Cracks | Remarks |
|---|---|---|---|---|
| 6-1 | A | 120 | Present | Low elongation, Com. Ex. |
| 6-2 | A1 | 120 | Present | Low elongation, Com. Ex. |
| 6-3 | B | 120 | Present | Low elongation, Com. Ex. |
| 6-4 | B1 | 120 | Present | Low elongation, Com. Ex. |
| 6-5 | B2 | 120 | Absent | Example |
| 6-6 | C | 120 | Present | Low elongation, Com. Ex. |
| 6-7 | C1 | 120 | Present | Low elongation, Com. Ex. |
| 6-8-1 | C2 | 120 | Absent | Example |
| 6-8-2 | C2 | 50 | Absent | Example |
| 6-8-3 | C2 | 5 | Present | Low $R_1$, Com. Ex. |
| 6-9 | D | 120 | Present | Low elongation, Com. Ex. |
| 6-10 | D1 | 120 | Present | Low elongation, Com. Ex. |
| 6-11-1 | D2 | 120 | Absent | Example |
| 6-11-2 | D2 | 50 | Absent | Example |
| 6-11-3 | D2 | 5 | Present | Low $R_1$, Com. Ex. |

What is claimed is:

1. A molded product, having an elongation not less than 100%, produced by the process comprising the steps of (1) curing a substantially linear polyarylene thioether which has repeating units of —Ar—S—(Ar represents an arylene group) as a main constituent, and has a melt viscosity of 1,000 to 15,000 poise at a temperature of 310° C. and a shearing rate of 200 second$^{-1}$ to obtain a polyarylene thioether resin having a melt viscosity, at 310° C. and a shearing rate of 200 second$^{-1}$, of about 5,000 to 16,000 poise and a non-Newtonian coefficient, n, of about 1.5 to 2.1, (2) melt extruding the polyarylene thioether resin, (3) taking off the extruded polyarylene thioether resin at an $R_1$ (ratio of a taking-off speed to an extruding speed at a nozzle of a melt extruded product) of about 10 to 1,000 and (4) crystallizing the taken off material until a crystallization degree (measured by a density method) of the material is not less than 20 wt%.

2. The molded product according to claim 1, wherein said step of curing is carried out by heating the substantially linear polyarylene thioether at a high temperature in an atmosphere containing oxygen and increasing its viscosity.

3. The molded product according to claim 1, wherein said crystallizing step is carried out by heating the molded product of polyarylene thioether at a temperature not lower than its secondary transition temperature and not higher than its melting point under a limited deformation.

4. The molded product according to claim 1, wherein said crystallizing step is carried out by treating the molded product of polyarylene thioether with an organic solvent or a combination of the treatment with an organic solvent and heat.

5. A coated electric wire produced by a process comprising the steps of (1) curing a substantialy linear polyarylene thioether which has repeating units of —Ar—S— (Ar represents an arylene group) as a main constituent and has a melt viscosity of 1,000 to 15,000 poise at a temperature of 310° C. and a shearing rate of 200 second$^{-1}$ to obtain a polyarylene thioether resin having a melt viscosity at 310° C. and a shearing rate of 200 second$^{-1}$ of about 5,000 to 16,000 poise and a non-Newtonian coefficient, n, of about 1.5 to 2.1, (2) melt extruding the polyarylene thioether resin and coating a conducting core wire with the polyarylene thioether resin, (3) taking off the extruded polyarylene thioether resin, which coats said conducting core wire, at an $R_1$ (ratio of a taking-off speed to an extruding speed at a nozzle of a melt extruded product) of about 10 to 1,000 and (4) crystallizing the taken off material until a crystallization degree (measured by a density method) of the material is not less than 20 wt%.

6. The coated electric wire according to claim 5, wherein said step of curing is carried out by heating the substantially linear polyarylene thioether at a high temperature in an atmosphere containing oxygen and increasing its viscosity.

7. The coated electric wire according to claim 5, wherein said crystallizing step is carried out by heating the taken off material of polyarylene thioether at a temperature not lower than its secondary transition temperature and not higher than its melting point under a limited deformation.

8. The coated electric wire according to claim 5, wherein said crystallizing step is carried out by treating the taken off material of polyarylene thioether with an organic solvent.

9. The coated electric wire according to claim 5, wherein said crystallizing step is carried out by treating the extruded product of polyarylene thioether with a combination of a treatment with an organic solvent and heat.

* * * * *